(12) United States Patent
Baek et al.

(10) Patent No.: US 11,909,062 B2
(45) Date of Patent: Feb. 20, 2024

(54) BATTERY PACK COMPRISING BATTERY PACK FRAME CAPABLE OF PREVENTING WELDING DEFECT AND PRESSING JIG FOR PREPARING THE SAME

(71) Applicant: LG CHEM, LTD., Seoul (KR)

(72) Inventors: Seung Ryul Baek, Daejeon (KR); Jeong Pyo Kong, Daejeon (KR); Jong Hwa Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 410 days.

(21) Appl. No.: 16/759,007

(22) PCT Filed: Oct. 4, 2019

(86) PCT No.: PCT/KR2019/012999
§ 371 (c)(1),
(2) Date: Apr. 24, 2020

(87) PCT Pub. No.: WO2020/071833
PCT Pub. Date: Apr. 9, 2020

(65) Prior Publication Data
US 2021/0184306 A1 Jun. 17, 2021

(30) Foreign Application Priority Data
Oct. 5, 2018 (KR) .................. 10-2018-0119139

(51) Int. Cl.
*H01M 50/289* (2021.01)
*H01M 50/209* (2021.01)
(Continued)

(52) U.S. Cl.
CPC ....... *H01M 50/289* (2021.01); *B23K 37/0443* (2013.01); *H01M 50/209* (2021.01); *B23K 2101/36* (2018.08); *H01M 50/211* (2021.01)

(58) Field of Classification Search
CPC ............ H01M 50/289; H01M 50/209; H01M 50/211; H01M 50/20; H01M 2220/20;
(Continued)

(56) References Cited

U.S. PATENT DOCUMENTS 8,647,792 B2 2/2014 Ueda
8,932,749 B2 1/2015 Lim
(Continued)

FOREIGN PATENT DOCUMENTS

CN 1874030 A 12/2006
CN 104078628 A 10/2014
(Continued)

OTHER PUBLICATIONS

Partial Supplementary European Search Report for European Application No. 19868716.2, dated Nov. 15, 2021.
(Continued)

*Primary Examiner* — Kiran Quraishi Akhtar
(74) *Attorney, Agent, or Firm* — Birch, Stewart, Kolasch & Birch, LLP (57) ABSTRACT

A battery pack is provided including a battery module having a plurality of battery cells or a unit module having the plurality of battery cells; a battery pack frame body including a base plate on which the battery module or the unit module is mounted, and a first side plate and a second side plate connected to the base plate and disposed to face each other; a top frame coupled to an upper portion of the battery pack frame body; and a first end plate and a second end plate electrically connected to electrode terminals of the battery module or the unit module, wherein at least one of the first end plate and the second end plate is configured to include slits.

6 Claims, 6 Drawing Sheets

(51) Int. Cl.
*B23K 37/04* (2006.01)
*B23K 101/36* (2006.01)
*H01M 50/211* (2021.01)

(58) Field of Classification Search
CPC ........... H01M 10/0404; B23K 37/0443; B23K 2101/36; B23K 37/0408; Y02E 60/10; B25B 11/02
See application file for complete search history.

(56) References Cited

U.S. PATENT DOCUMENTS

| | | | |
|---|---|---|---|
| 10,224,583 B2 | 3/2019 | Kim et al. | |
| 2006/0275658 A1 | 12/2006 | Sanada et al. | |
| 2007/0054172 A1 | 3/2007 | Ueda | |
| 2013/0022859 A1 | 1/2013 | Lim | |
| 2013/0230761 A1* | 9/2013 | Okutani | H01M 50/516 429/158 |
| 2014/0295235 A1 | 10/2014 | Jung | |
| 2015/0064543 A1 | 3/2015 | Jung | |
| 2015/0099146 A1 | 4/2015 | Kim et al. | |
| 2015/0249237 A1* | 9/2015 | Naito | H01R 12/58 429/7 |
| 2018/0138565 A1* | 5/2018 | Lee | H01M 50/209 |
| 2018/0169780 A1 | 6/2018 | Jin et al. | |
| 2018/0190952 A1* | 7/2018 | Kim | H01M 50/244 |
| 2019/0305268 A1 | 10/2019 | Ryu et al. | |

FOREIGN PATENT DOCUMENTS

| | | | | |
|---|---|---|---|---|
| CN | 107848071 A | 3/2018 | | |
| CN | 108463903 A | 8/2018 | | |
| JP | 2002-302785 A | 10/2002 | | |
| JP | 2006-331805 A | 12/2006 | | |
| JP | 2007-103337 A | 4/2007 | | |
| JP | 2012-181970 A | 9/2012 | | |
| JP | 2013-73917 A | 4/2013 | | |
| JP | 2014-199813 A | 10/2014 | | |
| JP | 2014-239014 A | 12/2014 | | |
| JP | 2018-56087 A | 4/2018 | | |
| KR | 10-0744020 B1 | 7/2007 | | |
| KR | 10-2013-0011740 A | 1/2013 | | |
| KR | 10-2013-0126159 A | 11/2013 | | |
| KR | 10-2015-0024999 A | 3/2015 | | |
| KR | 10-2017-0030954 A | 3/2017 | | |
| KR | 10-2017-0036639 A | 4/2017 | | |
| KR | 10-2018-0018113 A | 2/2018 | | |
| WO | WO 2012/073399 A1 | 6/2012 | | |
| WO | WO 2012/133711 A1 | 10/2012 | | |
| WO | WO2017052296 | * | 3/2017 | ........ H01M 10/6554 |
| WO | WO2017078306 | * | 5/2017 | ............ H01M 2/10 |
| WO | WO 2018/030787 A1 | 2/2018 | | |

OTHER PUBLICATIONS

International Search Report issued in PCT/KR2019/012999 (PCT/ISA/210), dated Jan. 13, 2020.

* cited by examiner

BATTERY PACK COMPRISING BATTERY PACK FRAME CAPABLE OF PREVENTING WELDING DEFECT AND PRESSING JIG FOR PREPARING THE SAME

TECHNICAL FIELD

The present invention relates to a battery pack comprising a battery pack frame capable of preventing welding defects and a pressing jig configured to manufacture the same. Particularly, the present invention relates to a battery pack comprising a battery pack frame capable of preventing the close contact with an end plate due to different lengths between a top frame and a U frame by using the end plate, which freely changes in shape, and a pressing jig for manufacturing the same.

BACKGROUND ART

One of the biggest problems caused by vehicles using fossil fuel, such as gasoline and diesel oil, is the creation of air pollution. A technology of using a secondary battery, which can be charged and discharged, as a power source for vehicles has attracted considerable attention as one method of solving the abovementioned problem. As a result, development and commercialization of electric vehicles (EV), which are operated using only a battery, and hybrid electric vehicles (HEV), which jointly use a battery and a conventional engine, are in progress. A nickel-metal hydride (Ni-MH) secondary battery has been mainly used as the power source for the electric vehicles (EV) and the hybrid electric vehicles (HEV) in the past. In recent years, however, there has been a shift to the use of lithium secondary batteries.

High output and large capacity of lithium secondary batteries are needed for the lithium secondary batteries to be used as the power source for the electric vehicles (EV) and the hybrid electric vehicles (HEV). To this end, a plurality of small-sized secondary batteries (unit cells) are connected in series to each other so as to form a battery pack. Depending on circumstances, a plurality of small-sized secondary batteries (unit cells) are connected in series and in parallel to each other so as to form a battery pack.

For example, as a battery pack frame, in a case in which a U frame having a structure surrounding both sides and a bottom surface of a plurality of stacked battery cells or battery modules and a top frame covering an upper surface of the U frame are used, there may be a problem that sealing by an end frame coupled to ends of the U frame and the top frame is not completely provided, if there is a difference between the length of the U frame and the length of the top frame.

In particular, in a case in which the length of a U frame is longer than the length of a top frame, when an end frame is coupled to an end of a coupled frame after the U frame and the top frame are coupled, the end frame is closely coupled to the U frame which is relatively protruded. However, as long as a top frame coupling part of the end frame is not extended, a distance between the end frame and the top frame may occur so that a close contact cannot be made.

In such a case, with an external force such as vibration applied, there may be problems such as a difficulty to stably fix a unit cell, an electrical connection, or contamination due to infiltration of foreign matter. These problems may cause particularly serious problems in battery packs used in devices with high external force such as electric vehicles.

In this regard, attempts have been made to reliably achieve a fixation and electrical connection of unit cells by improving a coupling structure of a pack frame providing a battery pack.

Patent Document 1 discloses a battery module having a structure in which an outer circumferential surface of a cell assembly including a plurality of secondary batteries is surrounded by a cooling plate, a front cover, a rear cover, a left side cover, a right side cover, and an upper plate. The battery module has stable strength and rigidity and provides high sealability and assemblability.

However, the battery module of Patent Document 1 applies cover members that are independently separable on each outer surface surrounding the cell assembly. Therefore, as it requires a precise control of a position when performing a welding process for connecting of the cover members, there is a disadvantage in that the convenience and precision of the process are low.

Patent Document 2 discloses a fuel-cell stack including a laminate having a plurality of unit cells laminated and accommodated in a box-like casing, wherein the casing includes a pair of end plates arranged at both ends of the laminate, side plates arranged at sides of the laminate, a plurality of hinge plates welded to both ends of the side plates, and linking pins linking the pair of end plates and the plurality of hinge plates.

As described above, since the casing of Patent Document 2 has plate structures corresponding to each of the outer surfaces of the laminate, the plate structures being connected by spot welding or using the linking pins, the problem provided in Patent Document 1 has not been solved.

Patent Document 3 discloses a fuel cell stack structure accommodating a stack of battery cells in a box-shaped casing, such that the casing includes a first end plate, a second end plate, and four side panels; grooves are formed at each of the outer periphery of the first end plate, the second end plate, and the side panels to couple each other; and a pin is inserted into the grooves to fix the casing structure.

When coupling the first end plate, the second end plate, and the side panels by forming the grooves in each of the outer periphery of the first end plate, the second end plate and the side panels as in Patent Document 3, it is possible to have more stable coupling than those of Patent Documents and 2. However, the casing having a through hole for inserting the pin has a disadvantage in that the weight and the volume of a battery pack are increased due to the relatively increased thickness.

Patent Document 4 discloses a fuel cell stack having a structure in which a plurality of fuel cell laminates are accommodated in a first end plate, a second end plate, a first side plate, a second side plate, an upper plate, and a lower plate.

In Patent Document 4, grooves passing through the first end plate, the second end plate, the first side plate, the second side plate, the upper plate, and the lower plate are formed along the outer periphery of the first end plate, the second end plate, the first side plate, the second side plate, the upper plate, and the lower plate, and a screw is inserted into the grooves in order to couple the plates each other.

As a result, there is a high necessity for a battery pack capable of maintaining a stable stack structure of a battery cell or battery modules by simplifying a casing structure of a battery pack, and capable of improving a structural strength against vibration even when an external force is applied to the battery modules.

PRIOR ART DOCUMENT

Patent Document

Korean Patent Application Publication No. 2017-0036639 (2017.04.03)
Japanese Patent Application Publication No. 2007-103337 (2007.04.19)
Japanese Patent Application Publication No. 2006-331805 (2006.12.07)
Japanese Patent Application Publication No. 2014-239014 (2014.12.18)

DISCLOSURE

Technical Problem

The present invention has been made in view of the above problems, and it is an object of the present invention to provide a battery pack that is capable of preventing a coupling force from being lowered due to the difference in frame length during the assembly process of a battery pack frame.

Technical Solution

In accordance with the present invention, the above and other objects can be accomplished by the provision of a battery back including a battery module including a plurality of battery cells or a unit module including the plurality of battery cells; a battery pack frame body including a base plate on which the battery module is mounted, and a first side plate and a second side plate connected to the base plate and disposed in opposite directions to each other; a top frame coupled to an upper portion of the battery pack frame body; and a first end plate and a second end plate electrically connected to electrode terminals of the battery module, wherein at least one of the first end plate and the second end plate is configured to form slits.

In addition, the slits may be formed at edge portions of the first end plate and the second end plate.

In addition, the edge portions may be closely coupled to the battery pack frame body and the top frame.

In addition, the coupling may be performed by welding.

In addition, the slits may be formed in a diagonal direction from edges of the first end plate and the second end plate toward a center part.

In addition, the length of the battery pack frame body and the length of the top frame may be different from each other.

In addition, the battery pack may further include at least one slit formed in a direction of the center part at the outer periphery of the first end plate and the second end plate.

In addition, a pressing jig configured to manufacture the battery pack may include a planar pressing part configured to press the first end plate and the second end plate, the planar pressing part facing the first end plate and the second end plate; and a plurality of partial pressing parts coupled to the planar pressing part, to which different pressing forces are applied.

In addition, the plurality of partial pressing parts may be coupled to edge portions of the other surface of the planar pressing part facing the first end plate and the second end plate.

In addition, the plurality of partial pressing parts are coupled on the other surface of the planar pressing part corresponding to the slits formed in the first end plate and the second end plate.

In addition, an area of the planar pressing part may be equal to or larger than an area of the first end plate and the second end plate.

In addition, the plurality of partial pressing parts may include a first partial pressing part configured to apply a pressing force toward the top frame, and a second partial pressing part except for the first partial pressing part. A pressing force of the first partial pressing part may be greater than a pressing force of the second partial pressing part.

In addition, a device comprising the battery pack as an energy source may be any one selected from the group consisting of an electric vehicle, a hybrid electric vehicle, an electric bicycle, and a power storage device.

Effects of the Invention

As described above, since a battery pack according to the present invention may have a stable sealing even if there is a difference in the length of a battery pack frame, foreign substances such as external moisture or dust do not easily penetrate into the battery pack, and therefore, it is possible to prevent breakdown or damage of the battery pack due to the foreign substances.

In addition, since the stable sealing of the battery pack may be easily performed, it is possible to improve the processability.

In addition, due to the stable sealing of the battery pack, it is possible to provide a stable position of a battery cell or a battery module and to further improve the reliability of the electrical connection.

DETAILED DESCRIPTION OF THE INVENTION

Hereinafter, preferred embodiments of the present invention will be described in detail with reference to the accompanying drawings such that the preferred embodiments of the present invention can be easily implemented by those skilled in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the another part, but also, the one part may be indirectly connected to the another part via a further part. In addition, that a certain element is included does not mean that other elements are excluded, but means that such elements may be further included unless mentioned otherwise.

A battery pack according to the present invention may include a battery module including a plurality of battery cells or a unit module including the plurality of battery cells; a battery pack frame body including a base plate on which the battery module is mounted, and a first side plate and a second side plate connected to the base plate and disposed in opposite directions to each other; a top frame coupled to an upper portion of the battery pack frame body; and a first end plate and a second end plate electrically connected to electrode terminals of the battery module, wherein at least one of the first end plate and the second end plate is configured to form slits.

The battery cell may be a pouch-type battery cell, a cylindrical battery cell or a prismatic battery cell, and a pouch-type battery cell, which can be easily modified and can be manufactured at low cost, may be used.

The battery module may be configured to have a plurality of battery cells, or may be configured to have a battery module including a unit module having a plurality of battery cells, wherein the unit module may be configured to surround the plurality of battery cells with a cell cover.

In a preferred embodiment, a battery pack may be configured to have a plate-shaped plate of a size corresponding to each of outer surfaces of the battery module having a generally rectangular parallelepiped shape. In particular, the battery pack may be configured to have four side plates and end plates coupled to both ends opened in a state in which the side plates are coupled.

Or, in another preferred embodiment, a battery pack may be configured to have a structure comprising a battery pack frame body having a U-shape as a whole including a base plate on which a battery module is mounted, and a first side plate and a second side plate extending in the vertical direction from both sides of the base plate, in which the first side late and the second side plate are located in opposite directions parallel to each other. The frame having such a structure is called a U frame.

When the U frame is used as a battery pack frame, the battery pack may include a top frame coupled to an upper portion of the battery pack frame body, a first end plate and a second end plate disposed respectively in both directions from which the electrode terminals of the battery module protrude.

Figure 1:
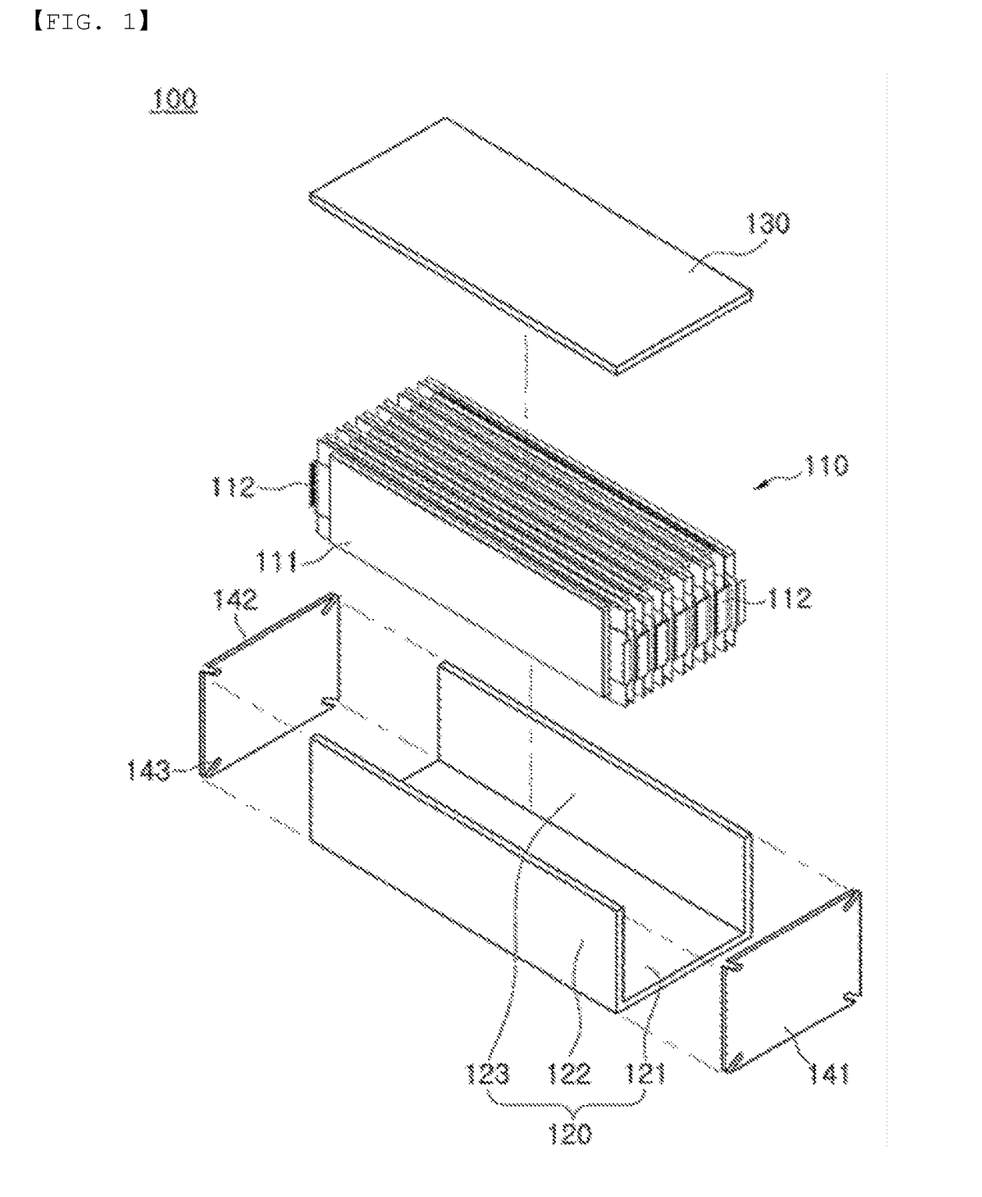
FIG. 1 is an exploded perspective view of a battery pack according to an embodiment.

In this regard, FIG. 1 schematically illustrates an exploded perspective view of a battery pack according to one embodiment.

Referring to FIG. 1, a battery pack 100 comprises a battery module 110 including pouch-type battery cells 111; a battery pack frame body 120 having a U-shape surrounding side and bottom surfaces of the battery module 110; a top frame 130 disposed on a top surface of the battery module 110; and a first end plate 141 and a second end plate 142 coupled to electrode terminals 112 of the battery module 110.

The battery pack frame body 120 comprises a base plate 121 on which the battery module 110 is mounted, and a first side plate 122 and a second side plate 123 connected to the base plate 121 and disposed in opposite directions to each other.

As described above, when a battery pack includes a plate-shaped plate having a size corresponding to each outer surface of a battery module, or when a battery pack uses a battery pack frame having a structure including a U frame, a coupling failure may occur in a case in which the lengths of plates or frames having a structure separated from each other are not identical.

For example, in the case of having four side plates in which the lengths of the side plates are different from each other, an inflexible end plate may be used to be coupled to the longest side plate in close contact. On the other hand, since a distance occurs between the relatively short side plate and the end plate, there may be a problem of making the coupling difficult between the relatively short side plate and the end plate.

Even in the case of using the U frame in which the length of the U frame is longer than the length of the top frame, an inflexible end plate may be used to be coupled to the longer U frame but may not be coupled to the relatively short top frame due to a distance occurred between the top frame and the U frame.

In order to solve the above described problem, the end plate according to the present invention may comprise a first end plate and a second end plate having a structure capable of flexible deformation by forming slits in at least one of the first end plate and the second end plate.

For example, in consideration of coupling the top frame to one side of the battery pack frame body, it is preferable to have the slits formed in the end plate be formed at edge portions of the first end plate and the second end plate.

Both sides divided based on the slits may be easily deformed independently without being affected by the shape deformation of each other. Therefore, although the length of the top frame is relatively shorter than the length of the battery pack frame body, an end plate portion contacting the battery pack frame body by the slits formed at the edge portion may be coupled to the outer periphery of the battery pack frame body and an end plate portion adjacent to the top frame may be bent in the top frame direction so as to be coupled to the top frame.

That is, all edge portions of the end frame may be closely coupled to the battery pack frame body and the top frame. In this case, the coupling may be performed by welding, and the welding may use resistance welding such as spot welding, bet welding, seam welding, or arc welding.

Figure 2:
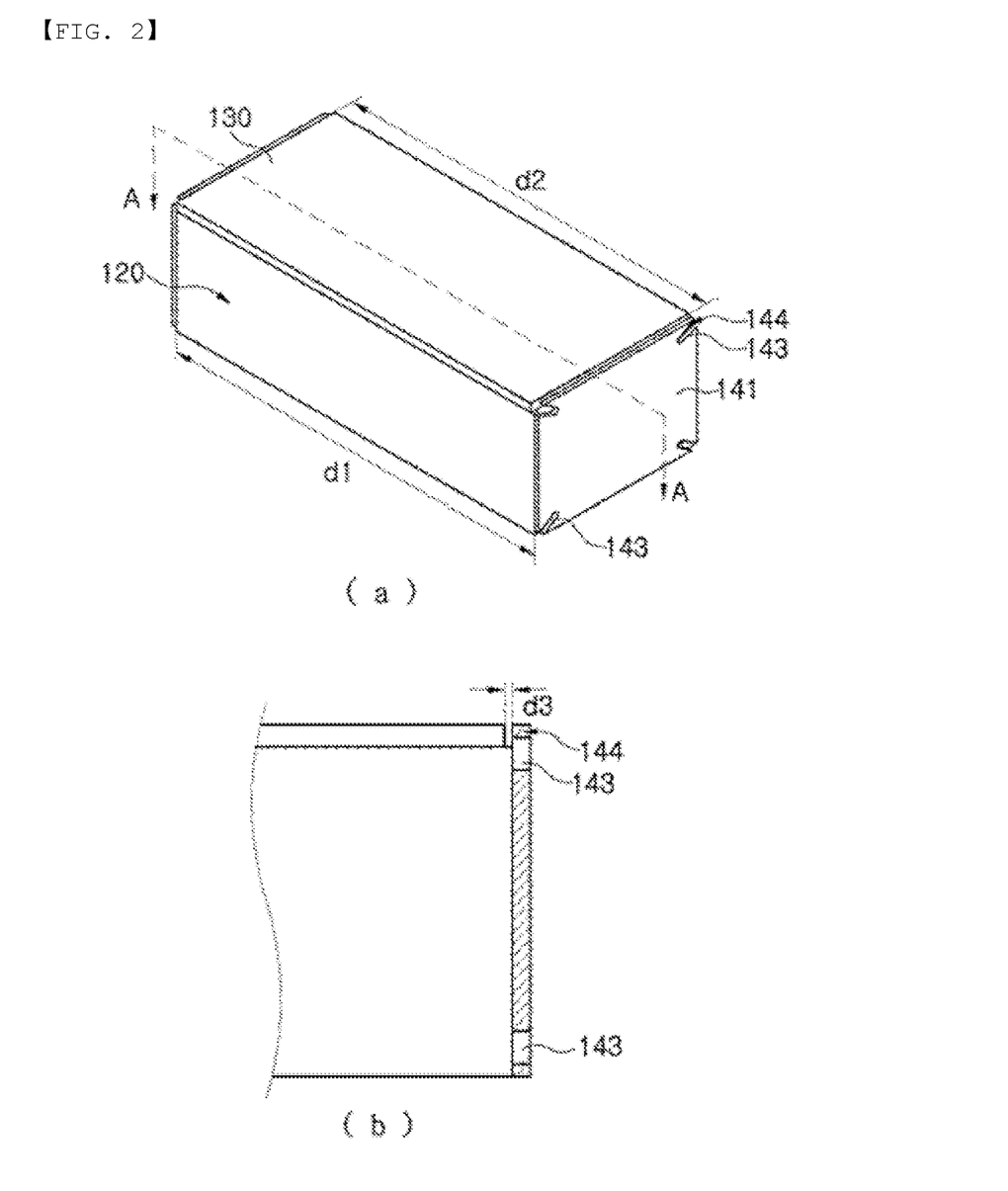
FIG. 2 is a perspective view and a side view showing a state before an end plate is deformed in the battery pack of FIG. 1.
Figure 3:
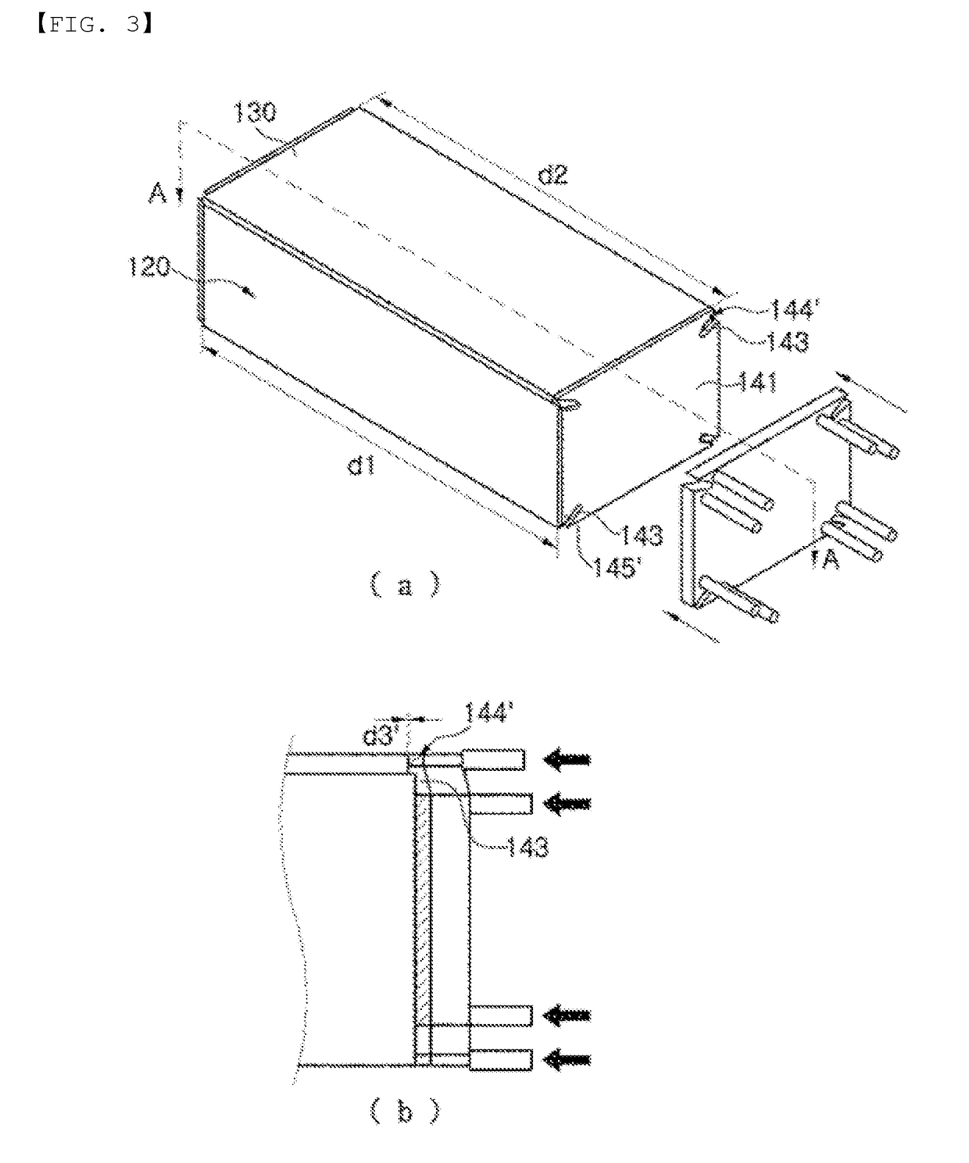
FIG. 3 is a perspective view and a side view showing a state in which the end plate is deformed in the battery pack of FIG. 1.

In this regard, FIG. 2(a) is a perspective view of the battery pack of FIG. 1, which is a perspective view showing a state of an end plate before being coupled to a top frame by pressing the end plate, and FIG. 2(b) is a side view of FIG. 2(a). FIG. 3(a) is a perspective view showing a state in which the end plate is coupled to the top frame by pressing the end plate in the battery pack of FIG. 2, and FIG. 3(b) is a side view of FIG. 3(a).

Referring to FIGS. 2 and 3, the top frame 130 is disposed on the top of the battery pack frame body 120 having a U-shape, and the length d1 of the battery pack frame body 120 is longer than the length d2 of the top frame 130. Therefore, when the partial pressure is not applied to the first end plate 141, a portion of the first end plate 141 facing the battery pack frame body 120 is disposed in close contact with the battery pack frame body 120, while the edge portion 144 of the end plate facing the top frame 130 is disposed with a distance d3 being formed.

Figure 6:
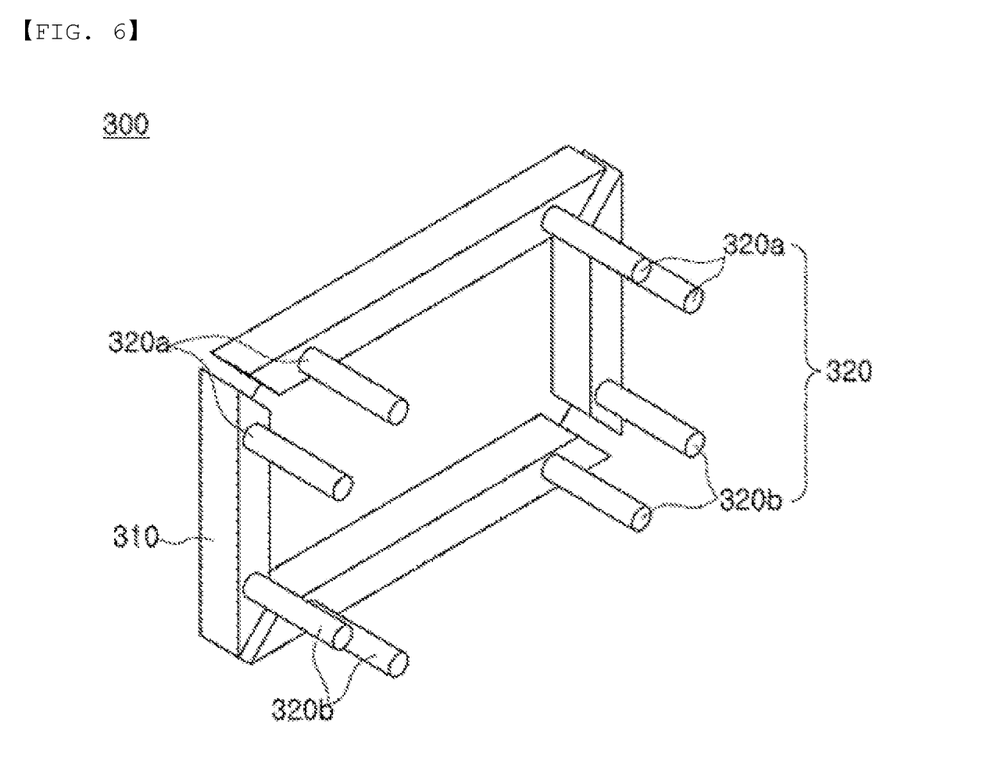
FIG. 6 is a perspective view of a pressing jig according to one embodiment.

As shown in FIG. 3, however, the outer surface of the first end plate 141 may be pressed in the direction of the arrow by using a pressing jig 300 including a plurality of partial pressing parts 320a and 320b shown in FIG. 6.

The pressing jig 300 may adjust the force applied to the first partial pressing part 320a, which presses an edge portion 144' facing the top frame 130 from the first end plate 141, to be stronger than the force applied to the second partial pressing part 320b, which presses a portion 145' facing the battery pack frame body 120. As a result, the edge portion 144' disposed at a portion of the first end plate 141 facing the top frame 130 may be bent in the direction of the top frame 130 to be in close contact with the top frame 130. Therefore, in FIG. 2, the distance d3 formed at the portion where the top frame and the edge portion of the end plate face each other disappears, and thus becomes 0 as shown in d3' of FIG. 3.

As such, when welding is performed in a state in which the first end plate is deformed, the coupling force may be further improved.

Figure 4:
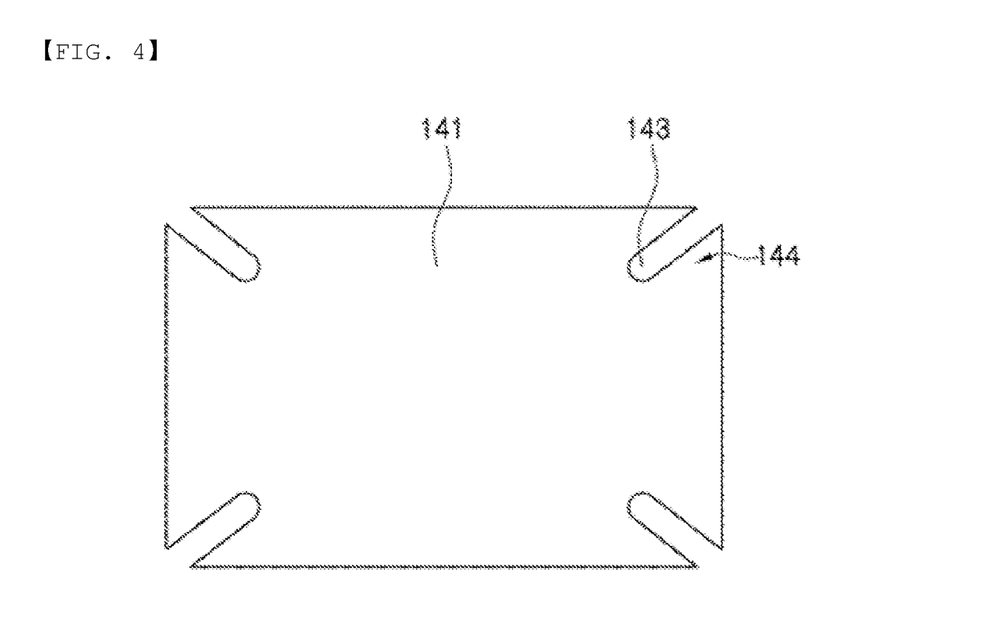
FIG. 4 is a plan view of the end plate according to one embodiment.
Figure 5:
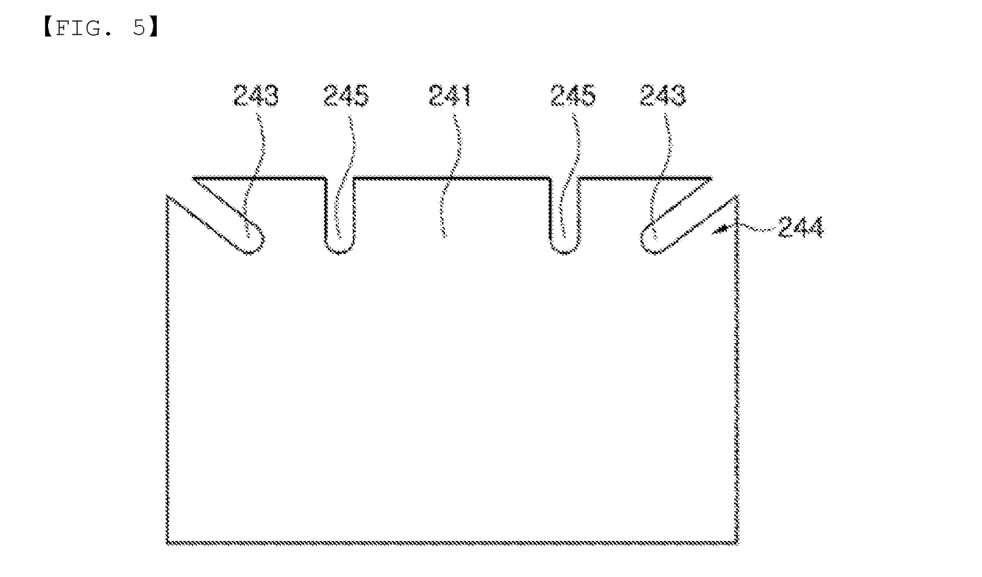
FIG. 5 is a plan view of the end plate according to another embodiment.

FIG. 4 is a plan view of an end plate according to one embodiment, and FIG. 5 is a plan view of an end plate according to another embodiment.

A first end plate 141 of FIG. 4 is the same as the first end plate 141 of FIGS. 1 to 3, and the first end plate 141 described below may be equally applied to the structure of the second end plate 142 of FIG. 1. The first end plate 141 has a structure in which slits 143 are formed only on the four edge portions 144, and the slits have a structure starting from an edge of the first end plate and extending diagonally toward the center part of the end plate. When the length of the slits is too short, it is difficult to achieve the purpose of increasing the degree of freedom of deformation of the end plate. When the length of the slits is too long, foreign matters may be introduced into the battery pack through the slits. Therefore, it is preferable to have the length and width of the slits formed in an appropriate size in consideration of the thickness and rigidity of the end plate, and the size of the battery pack.

In an end plate 241 of FIG. 5, the slits 243 are formed at an upper edge portion 244 as in the first end plate of FIG. 4. In addition, the end plate 241 of FIG. 5 further includes two slits 245 formed in a vertical direction from the upper outer periphery toward the center part. For example, when a protrusion or a recess is formed at the outer periphery of the top frame in the end plate direction, additional slits 245 may be further formed as shown in the end plate of FIG. 5 in order to have that the end plate may be in close contact with the outer periphery of the top frame. The end plate 241 may certainly be used in place of the first end plate 141 and the second end plate 142 of FIG. 1.

In addition, the present invention provides a pressing jig configured to manufacture the battery pack comprising a planar pressing part configured to press the end plate in a state facing the first end plate and the second end plate; and a plurality of partial pressing parts coupled to the planar pressing part, to which different pressing forces are applied.

That is, in order to couple the end plate in close contact with the battery pack frame body and the top frame, the end plate may be able to be deformed to partially curved or bent depending on the length of the battery pack frame body and the top frame. Therefore, the bending degree of the end plate may be adjusted partially by applying a different pressing force to each of the plurality of partial pressing parts as in the pressing jig.

In one concrete embodiment, the partial pressing part may be coupled to an edge portion of the other surface of the planar pressing part facing the first end plate and the second end plate.

That is, the plurality of partial pressing parts may be coupled to an edge portion of the other side of the planar pressing part so that the entire outer periphery of the first end plate and the second end plate may be completely in contact with the battery pack frame body and the top frame.

As in the battery pack shown in FIG. 2, when the length of the top frame is shorter than the length of the battery pack frame body, a relatively strong pressing force should be applied so that the edge portion of the end plate coupling to the top frame may be bent more so as to be in close contact to the top frame. Therefore, the plurality of partial pressing parts are configured to have a first partial pressing part configured to apply a pressing force to the upper edge of the planar pressing part to have the first end plate and the second end plate in close contact with the tope frame; and a second partial pressing part configured to press a lower edge of the planar pressing part to be in close contact with the battery pack frame body. The pressing force of the first partial pressing part may be greater than the pressing force of the second partial pressing part.

In this regard, FIG. 6 schematically illustrates a pressing jig according to one embodiment.

Referring to FIG. 6, a pressing jig 300 includes a planar pressing part 310 configured to press in a state facing the end plate; and a plurality of first partial pressing parts 320a and a plurality of second partial pressing parts 320b, which are coupled to the planar pressing portion 310, with different pressing forces are applied, respectively. The planar pressing part 310 has slits formed at a position corresponding to the slits formed in the edge portion of the end plate, and the partial pressing parts 320a and 320b are coupled to both sides based on the slits.

Since the pressing force applied to the first partial pressing part 320a and the second partial pressing part 320b may be different from each other, a portion requiring more deformation of the end plate may be coupled in close contact with the top frame and the battery pack frame body as the end plate is deformed by applying a stronger pressing force.

In order for the planar pressing part to apply a uniform or partially different force to the entire end plate, the area of the planar pressing part 310 may be formed equal to or larger than the area of the first end plate and the second end plate.

Figure 7:
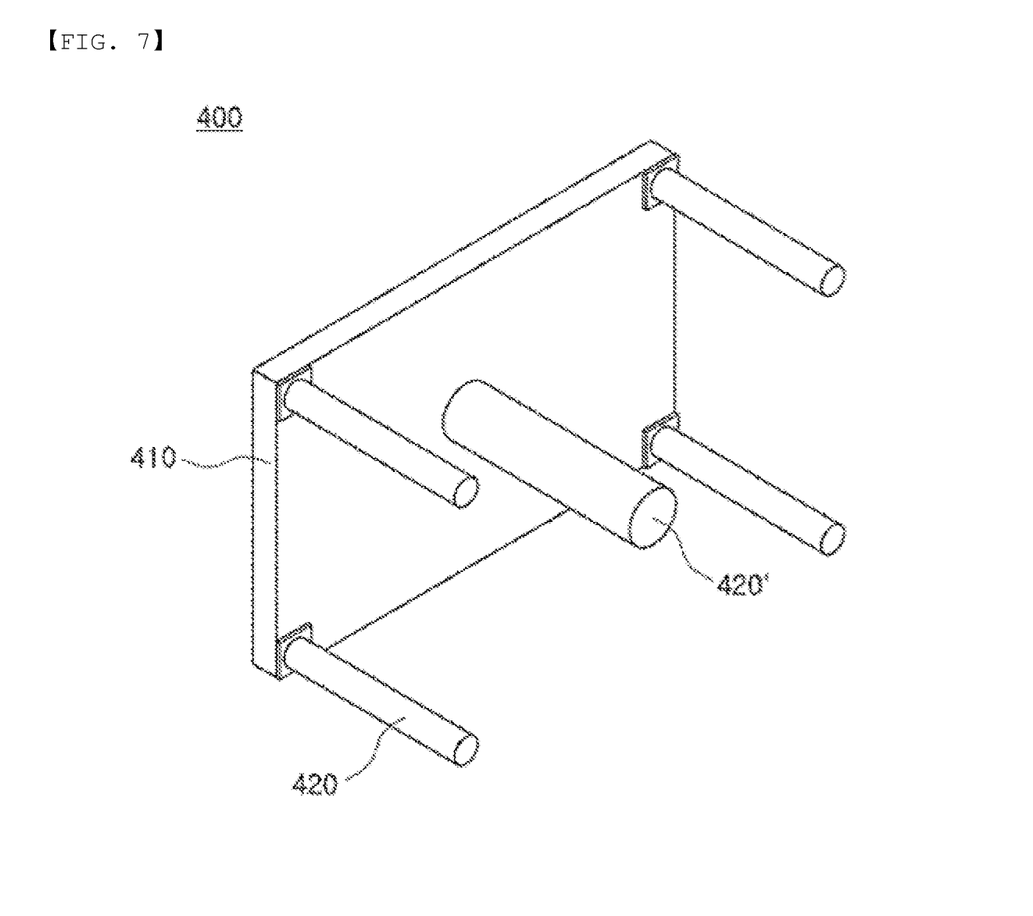
FIG. 7 is a perspective view of a pressing jig according to another embodiment.

FIG. 7 is a perspective view of a pressing jig according to another embodiment.

Referring to FIG. 7, a pressing jig 400 includes a planar pressing part 410 configured to press in a state facing the end plate and partial pressing parts 420 coupled to the planar pressing part with different pressing forces are applied. Since the pressing jig 400 has a planar structure having no slits formed in the planar pressing part 410 of the pressing jig 400 of FIG. 7, the partial pressing part 420 is attached to each edge portion of the planar pressing part 410 and one partial pressing part 420' is attached to the center of the planar pressing part 410.

Since the magnitude of the force applied to the partial pressing part may be determined based on the outer periphery structure and the end plate shape of the top frame and the battery pack frame body, the pressing force applied to each of the partial pressing portions 420 attached to the edge portion of the planar pressing portion 410 may be different from each other, and the partial pressing portion attached to the edge portion and the partial pressing portion 420' attached to the center may certainly be different from each other.

On the other hand, slits may be formed in a portion other than the edge portion of the end plate, such as the end plate shown in FIG. 5. In such a case, it is preferable that a pressing jig including a planar pressing part formed in a form corresponding to the end plate is used.

As such, when using the battery pack and the pressing jig according to the present invention, it is possible to prevent the problem that the coupling force is lowered even if the length of the battery pack frame is different from each other.

Those skilled in the art to which the present invention pertains will appreciate that various applications and modifications are possible based on the above description, without departing from the scope of the present invention.

DESCRIPTION OF REFERENCE NUMERALS

100: Battery pack
110: Battery module
111: Pouch-type battery cell
112: Electrode terminal
120: Battery pack frame body
121: Base plate
122: First side plate
123: Second side plate
130: Top frame
141: First end plate
142: Second end plate
143, 2443, 245: Slits
144, 144', 244: Edge portions
145': Portion facing the battery pack frame body on the first end plate
241: End plate
300, 400: Pressing jigs
310, 410: Planar pressing parts
320, 420, 420': Partial pressing parts
320a: First partial pressing part
320b: Second partial pressing part
d1: Length of battery pack frame body
d2: Length of top frame
d3, d3': Distance between edge portions of the top frame and the end plate

The invention claimed is:

1. A battery pack comprising:
a battery module comprising a plurality of battery cells or comprising a unit module including the plurality of battery cells;
a battery pack frame body comprising a base plate on which the battery module or the unit module is mounted, and a first side plate and a second side plate connected to the base plate and disposed to face each other;
a top frame coupled to an upper portion of the battery pack frame body; and
a first end plate and a second end plate electrically connected to electrode terminals of the battery module or the unit module, each of the first end plate and the second end plate having an inner surface and an outer surface as opposite surfaces,
wherein at least one of the first end plate and the second end plate is configured to include slits that penetrate through the at least one of the first end plate and the second end plate between the inner surface and the outer surface thereof,
wherein some of the slits are formed at corner edge portions of the at least one of the first end plate and the second end plate, and
wherein the some of the slits are formed in a diagonal direction from the corner edges of the first end plate and the second end plate toward a center part thereof.

2. The battery pack according to claim 1, wherein edge portions including the corner edge portions are configured to be closely coupled to the battery pack frame body and the top frame.

3. The battery pack according to claim 2, wherein the edge portions are coupled to the battery pack frame body and the top frame by welding.

4. The battery pack according to claim 1, wherein a length of the battery pack frame body and a length of the top frame are different from each other.

5. The battery pack according to claim 1, further comprising at least one slit of the slits formed in a direction of the center part at an outer periphery of the at least one of the first end plate and the second end plate.

6. The battery pack according to claim 1, wherein the inner surface and the outer surface of each of the first end plate and the second end plate are arranged perpendicular to the base plate, the first side plate, the second side plate and the top frame.

* * * * *